United States Patent [19]

Fujii

[11] Patent Number: 5,005,684

[45] Date of Patent: Apr. 9, 1991

[54] OVERLOAD CLUTCH

[75] Inventor: Shunji Fujii, Osaka, Japan

[73] Assignee: Tsubakimoto Emerson Co., Daito, Japan

[21] Appl. No.: 406,715

[22] Filed: Sep. 13, 1989

[30] Foreign Application Priority Data

Dec. 3, 1988 [JP] Japan .................................. 63-305154
Feb. 27, 1989 [JP] Japan ..................................... 1-43136
Feb. 27, 1989 [JP] Japan ..................................... 1-43137

[51] Int. Cl.⁵ ......................... F16D 7/08; F16D 43/206
[52] U.S. Cl. ..................................... 192/56 R; 464/36
[58] Field of Search .................. 192/56 R; 464/35, 36, 464/38

[56] References Cited

U.S. PATENT DOCUMENTS

| 1,904,375 | 4/1933 | Kind | 192/56 R |
| 2,493,232 | 1/1950 | Dodge | 192/56 R |
| 4,311,224 | 1/1982 | Kato et al. | 192/56 R |

FOREIGN PATENT DOCUMENTS 2018368 10/1979 United Kingdom ................... 464/36

Primary Examiner—Richard Lorence
Attorney, Agent, or Firm—Flynn, Thiel, Boutell & Tanis

[57] ABSTRACT

An overload clutch in which torque transmitting elements are held within hollow portions formed in one of a hub member or a driven plate member and are urged by a pressure plate against recesses formed in the other of the hub member or driven plate member so that torque may be transmitted and the torque transmitting elements are adapted to escape from said V-shaped recesses in opposition to an urging force. The pressure plate is formed with an inclined section for pressing the torque transmitting elements in a direction which substantially intersects the rotational axis of the clutch. The hollow portions for holding the torque transmitting elements are generally V-shaped when viewed axially, and the recesses for holding the torque transmitting elements are grooves of V-shaped cross section.

15 Claims, 15 Drawing Sheets

OVERLOAD CLUTCH

FIELD OF THE INVENTION

This invention relates to a so-called overload clutch in which transmission of torque may be shut off when an overload is encountered in a driven part.

BACKGROUND OF THE INVENTION

Conventionally, ball clutches and roller clutches have been provided as a safety device between a driving part and a driven part of a torque transmission mechanism so that the driving part may rotate idly when an overload is encountered in the driven part. Thus, possible damage to the transmission mechanism may be avoided.

In such an overload clutch, torque transmitting elements are held in hollow portions provided in one of a hub or a driven plate, and the torque transmitting elements are urged into recesses provided in the other of the hub or driven plate, thereby transmitting torque. When an overload is encountered in the driven part, the torque transmitting elements are adapted to escape from the recesses, thereby shutting off the torque transmission.

Conventionally, to enable the torque transmitting elements to move freely within the hollow portions during the escaping action, the elements are freely held within the hollow portions, namely by a substantial clearance.

However, with such a structure, when the driving part is reversely rotated, the clearance is liable to cause so-called "backlash", giving rise to relative displacement between the hub and the driven plate.

Moreover, even if the rotating direction is the same, the relative position between the hub and the driven plate may change due to the clearance after the overload condition has been removed.

It is possible to minimize the clearance by, for example, removing strain after heat treatment; however, such method entails a high manufacturing cost.

Accordingly, it is an object of this invention to provide an overload clutch in which the above-mentioned backlash may be eliminated and in which misalignment between the driving part and the driven plate may be absorbed. "Misalignment" refers to mounting error in terms of the spacing and the angular relative position between the driving part and the driven part.

Another object of this invention is to provide an overload clutch in which the backlash may be totally eliminated and in which torque transmission may be completely shut off in case of an overload being encountered.

SUMMARY OF THE INVENTION

The present invention comprises an overload clutch in which torque transmitting elements are held within hollow portions formed in one of a hub or a driven plate and are urged against V-shaped recesses formed in the other of the hub or driven plate so that torque may be transmitted and the torque transmitting elements are adapted to escape from the V-shaped recesses in opposition to the urging force.

The pressure plate is formed with an inclined section so that the torque transmitting elements may be urged in the direction crossing with the rotational axis of the overload clutch. The hollow portions for holding the torque transmitting elements are V-shaped when viewed axially, and the recesses for holding the torque transmitting elements are V-shaped grooves.

The torque transmitting elements are urged by the inclined section toward the V-shaped hollow portions and the V-shaped recesses making two-point contact with both of them during torque transmission. If an overload is encountered, the torque transmitting elements may escape from the V-shaped recesses by resisting the urging force imposed by the inclined section and ride on the flat portions of the driven plate so that the driving part may rotate idly.

Since the torque transmitting elements make a two-point contact with the V-shaped hollow portions and are urged by the inclined section, there is no cause for backlash.

This also means that there will be no relative displacement between the hub and the driven plate. Likewise, after the overload condition has been removed, the torque transmitting elements may positively fall into the V-shaped recesses; and therefore, the reengagement of the driving part and the driven part may be ensured.

Furthermore, since the shape of the V-shaped hollow portions may be relatively roughly formed, machining thereof is relatively easy and manufacturing cost may be low.

The present invention also comprises an overload clutch, as aforesaid, in which the driven plate having the hollow portions is held between the hub having the recesses and the pressure plate with respective gaps therebetween.

According to this feature, the driven plate formed with the hollow portions for holding the torque transmitting elements are allowed to move axially as well as to incline (i.e. tilt), and consequently, possible spacing and angular mounting errors between the two shafts to be connected may be absorbed in the overload clutch itself. Therefore, additional means for absorbing these errors are not required. Also, the overall rigidity will not depend upon such additional means for absorbing these errors.

The present invention further comprises an overload clutch, as aforesaid, in which flat portions between the recesses of the hub are provided with sloped step-portions which are located near the bottoms of the hollow portions from the pitch circle of the torque transmitting elements when they are held at two points with the hollow portion such that the angle of inclination thereof is greater than that of the inclined portions of the pressure plate.

When an overload is encountered, the torque transmitting elements ride onto the flat portions from the recesses. The torque transmitting elements are urged by means of the sloped step-portions provided in the flat portions such that they are separated from the two-point contact condition with the hollow portions. Consequently, the torque transmitting elements are held by the three members, namely, the flat portions, the sloped step-portions and the inclined section, and are released from the two-point contact with the hollow portions. Thus, the torque transmitting elements may freely roll.

Since rolling contact is assured as mentioned above, re-engagement of the overload clutch after the overload condition has been removed is made easier; and since no slippage occurs with the torque transmitting elements, seizure and wear may be prevented.

BRIEF DESCRIPTION OF THE DRAWINGS

FIGS. 1-5 show a first embodiment of this invention, wherein:
FIG. 1 is an axial sectional view;
FIG. 2 shows the hub as viewed along line 2—2 in FIG. 1;
FIG. 3 shows the driven plate as viewed along line 3—3 in FIG. 1;
FIG. 4 is a fragmentary view along line 4—4 in FIG. 3; and
FIG. 5 is a view similar to FIG. 1 but under an overload condition.

FIGS. 6 and 7 show a second embodiment, wherein:
FIG. 6 is an axial sectional view; and
FIG. 7 is an enlarged plan view of the hollow portion.

FIGS. 8-15 illustrate a third embodiment of this invention, wherein:
FIG. 8 is an axial sectional view;
FIG. 9 is a right side view of FIG. 8;
FIG. 10 is a front view of the driven plate;
FIG. 11 is a fragmentary top view of a collar portion;
FIG. 12 is a front view of the hub;
FIG. 13 is an enlarged fragmentary section taken axially under an overload condition;
FIG. 14 is a similar sectional view when the driven plate is allowed to move axially; and
FIG. 15 is also a similar sectional view when the driven plate is inclined.

FIGS. 16-22 illustrate a fourth embodiment of this invention, wherein:
FIG. 16 is an axial sectional view;
FIG. 17 is the driven plate as viewed along line 17—17 in FIG. 16;
FIG. 18 is a view along line 18—18 in FIG. 17;
FIG. 19 is a partially enlarged perspective view of the driven plate;
FIG. 20 is a sectional view showing the relationship between the torque transmitting element and recess while torque is transmitted;
FIG. 21 is a sectional view showing the relationship among the torque transmitting element, a flat portion and a sloped step-portion under an overload condition; and
FIG. 22 is a front view of the torque transmitting element and hollow portion under an overload condition.

FIGS. 24-30 depict a sixth embodiment of this invention, wherein:
FIG. 24 is an axial sectional view;
FIG. 25 is a front view of the driven plate;
FIG. 26 is a top view of FIG. 25;
FIG. 27 is a sectional view showing the relationship between the torque transmitting element and recess while torque is transmitted;
FIG. 28 is a front view showing the relationship between the torque transmitting element and hollow portion while torque is transmitted;
FIG. 29 is a sectional view showing the relationship among the torque transmitting element, a flat portion and a sloped step-portion under an overload condition; and
FIG. 30 is a front view of the torque transmitting element and hollow portion under an overload condition.

DETAILED DESCRIPTION

Hereinafter, with reference to the drawings, several embodiments of this invention will be explained with respect to ball clutches.

FIGS. 1 to 5 show a first embodiment of the present invention.

A hub 10 has a collar portion 13 at the center of a cylindrical sleeve part 11. A set screw 12 is threaded to the hub 10 so as to abut the shaft A1 to cause the hub 10 to rotate with the shaft A1.

Figure 2:
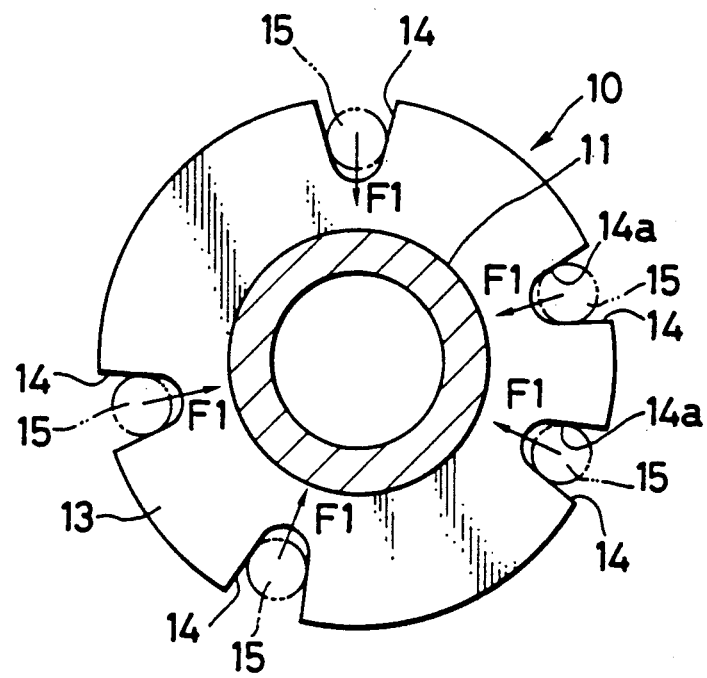

As shown in FIG. 2, a plurality of V-shaped notches (hollow portions for retaining torque transmitting elements) 14, each of which widens toward the peripheral wall of the collar portion 13, are formed in the collar portion 13 in the radial direction thereof at irregular angular intervals. The reason for this irregular angular arrangement is to limit the torque-transmitting point during one revolution to only one point. Thus, it is alternatively possible to dispose the notches at equal angular intervals, thereby increasing the torque-transmitting points during one revolution.

Torque transmitting elements or balls (steel balls) 15 are adapted to be urged against the bottom portions 14a of the notches 14 by means of an arrangement as hereafter explained.

There is provided a disk-shaped driven plate 17 adjacent to the left surface of the collar portion 13 so as to be rotatable with a radial bearing 16 between the cylindrical part 11 and the driven plate 17.

Figure 3:
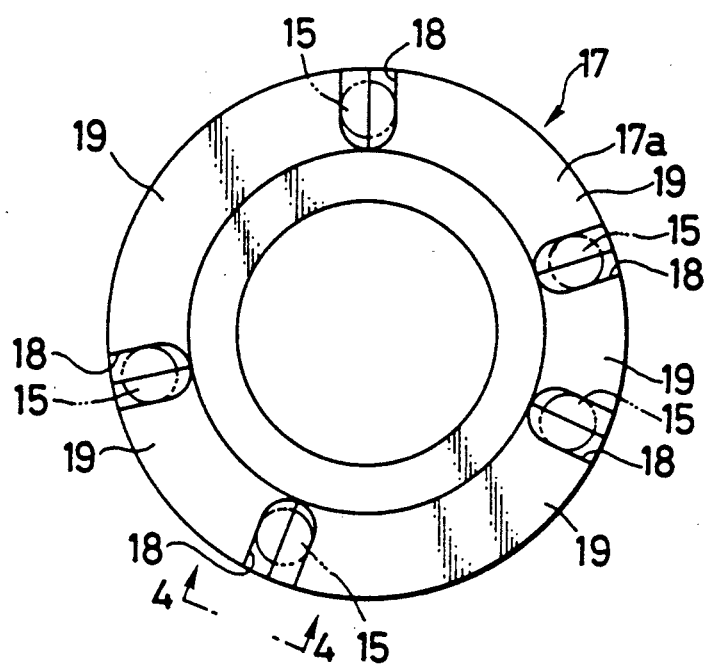
Figure 4:
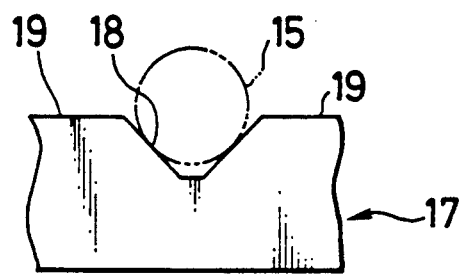
Figure 5:
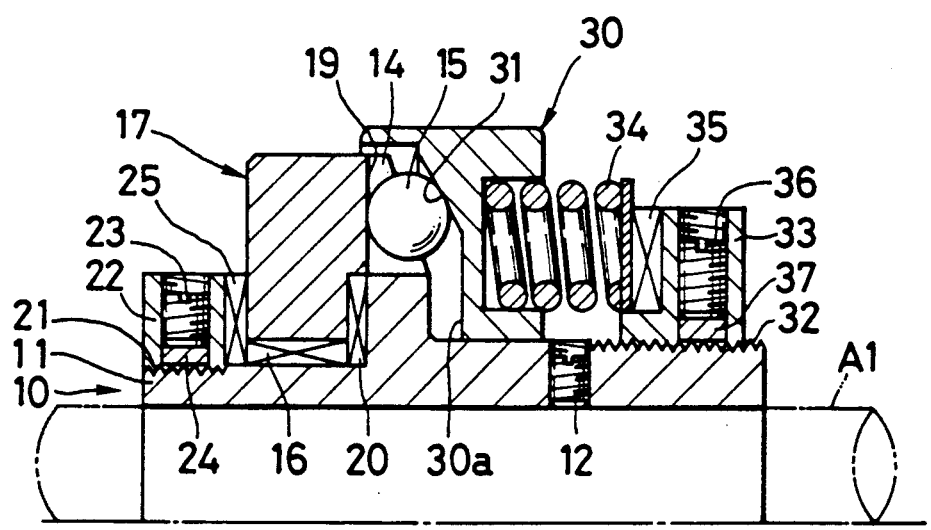

As shown in FIG. 3 and FIG. 4, V-shaped recesses 18 in which the balls 15 are held are radially formed on the right-hand surface 17a of the driven plate 17 opposite the collar portion 13 so as to face the notches 14 at the same respective angular positions. The portions between recesses 18 are flat surface portions 19. There is provided a thrust bearing 20 between the right-hand surface 17a of the driven plate 17 and the collar portion 13.

There is provided a thread 21 at the left-hand end of the cylindrical part 11. A fixing nut 22 threads on the thread 21. A set screw 23 threaded in the fixing nut 22 presses a locking plug 24 such that it engages the thread 21. Thus, the fixing nut 22 is prevented from loosening. A thrust bearing 25 is provided between the fixing nut 22 and the driven plate 17. The fixing nut 22 is adapted to apply a preloading to the thrust bearings 20, 25 and holds the driven plate 17 rotatably on the hub 11.

An annular pressure plate 30 is rotatably fitted at the right-hand side of the collar portion 13 on the cylindrical part 11 of the hub 10. An inclining section 31 is formed near the outer edge of the inner axial end surface 30a of the pressure plate, which surface 30a opposes the collar portion 13. The inclining section 31 is in the form of a truncated conical surface. The inclining section 31 presses the balls 15 toward the bottom portions 14a of the notches 14 as well as toward the ball retaining recesses 18 by means of the springs 34 as explained hereinafter.

The hub 10 is also provided with a thread 32 at the right-hand end thereof. An adjusting nut 33 engages this thread 32.

The coil springs 34 are provided between the adjusting nut 33 and the pressure plate 30 via a thrust bearing 35. The adjusting nut 33 is to adjust the force with which the pressure plate 30 presses the balls 15. A locking plug 37 positioned at the inner side of a set screw 36 abuts against the thread 32 such that the adjusting nut 33 is prevented from loosening.

Hereafter, on the assumption that the shaft A1 is a driving shaft and that the driven plate 17 is to be driven thereby, the operation will be explained.

When there is no overload, the balls 15 are pressed leftwardly owing to the pressing force received from the inclining section 31 due to the springs 34. The pressing force acts simultaneously toward the ball retaining recesses 18 due to the lateral (axial) component force P1 (FIG. 1) relative to the shaft A1 and toward the bottom portions 14a of the notches 14 due to the perpendicular (radial) component force F1 relative to the shaft A1. Accordingly, each ball 15 contacts the hub 10 at two points and the driven plate 17 at two points, respectively. Thus, since the balls 15 are urged into the V-shaped recesses 18 in a stable manner, the ball clutch can rotate as an integral body. Therefore, rotating torque of the shaft A1 is transmitted to a suitable system (not shown) as connected with the driven plate 17.

When an overload is encountered at the driven plate 17, the shaft A1 continues to rotate in spite of the driven plate 17 being prevented from rotating. Then the balls 15 move to the right in FIG. 1 being guided by the bottom portions 14a resisting the component force P1; escape from the ball retaining recesses 18; ride on the flat surface portions 19 (FIG. 5); and are urged and held between the flat portions 19 and the bottom portions 14a. In the interim, the pressure plate 30 is kept away from the driven plate 17 by the balls 15.

Consequently, the rotation of the hub 10 becomes free so that the shaft A1 may rotate idly.

As described above, according to the ball clutch of this embodiment of the present invention, since the balls 15 are urged by the inclining section 31 into the bottom portions 14a of the notches 14 and into the V-shaped recesses 18, and are supported by the hub 10 and the driven plate 17 with two-point contact, respectively, even if the rotating direction of the hub 10 is reversed, there is no backlash between the hub 10 and the driven plate 17.

Figure 1:
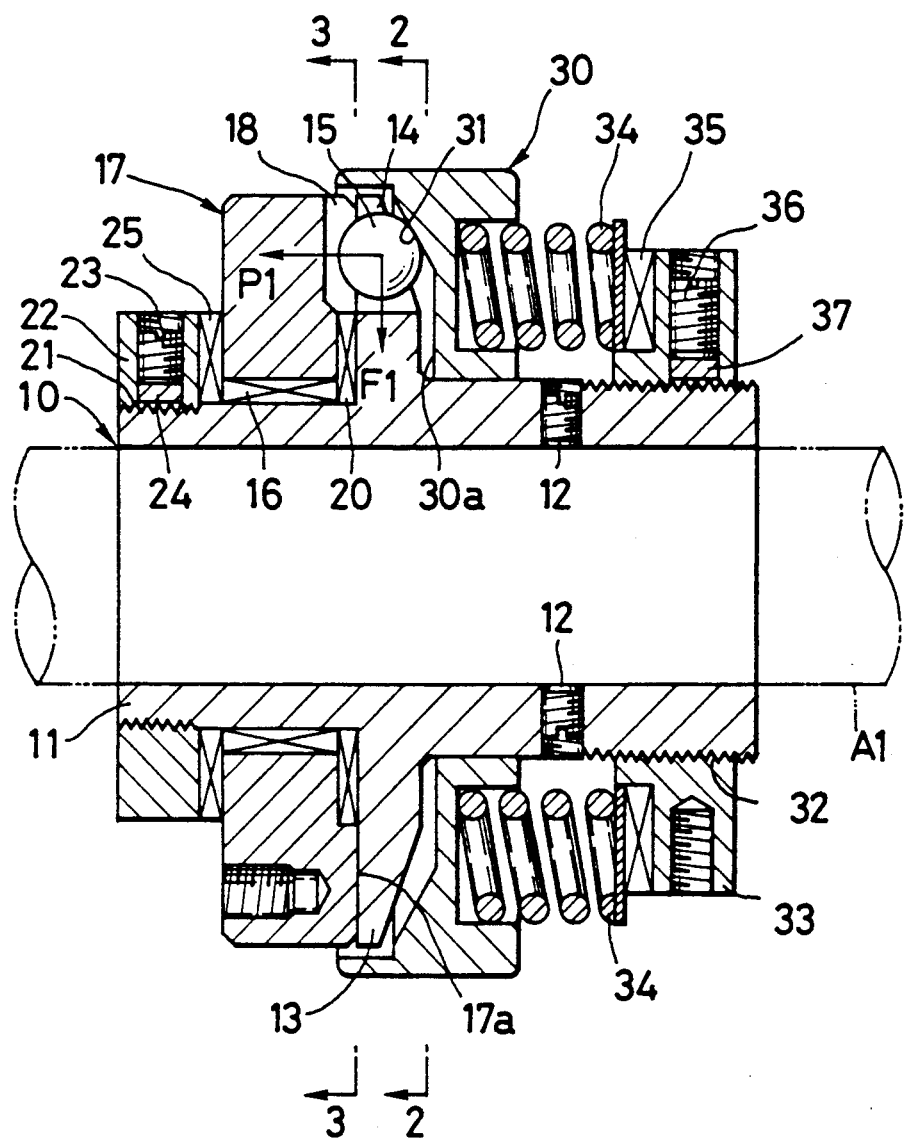

Furthermore, even if the overload condition is encountered, the balls 15 can move to the right in FIG. 1 under the guidance of the bottom portions 14a with two-point contact with the hub 10. Since the balls 15 can move to the left in FIG. 1 after the overload condition is removed, the balls 15 fall into the ball retaining recesses 18 again and are ensured to reengage therewith.

Moreover, as the balls 15 invariably contact the hub 10 both under torque transmitting condition and overload condition, the balls 15 can settle into the predetermined positions irrespective of the machining accuracy of the notches 14. Accordingly, the notches 14 may be formed at a lower cost because the elimination of stress after heat treatment is unnecessary.

Furthermore, the notches 14 may be in any form so long as they are hollow and become wider toward the radially outer edge.

Figure 6:
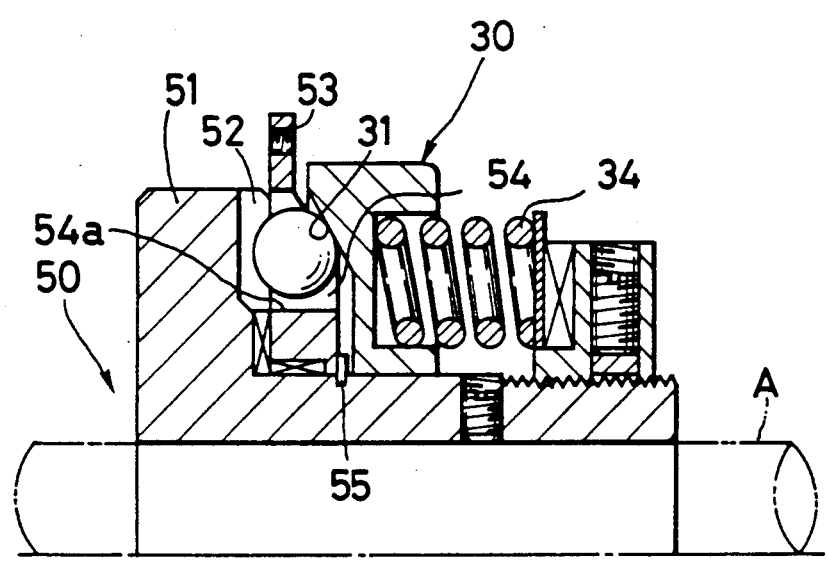
Figure 7:
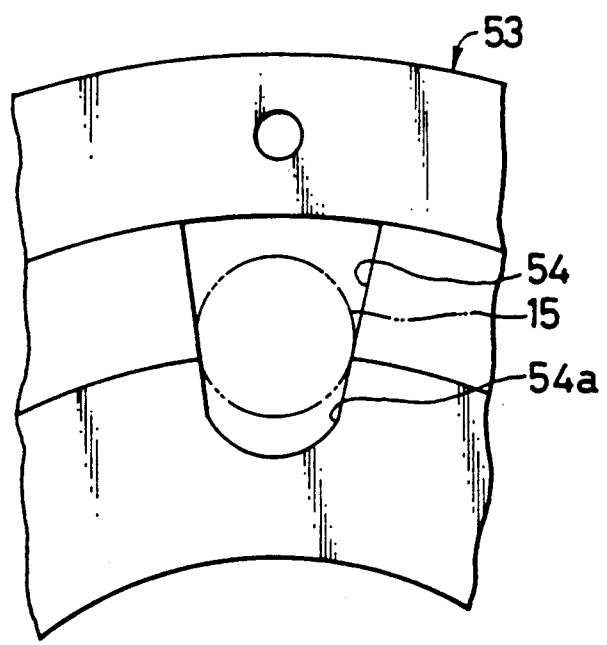

FIGS. 6 and 7 show a second embodiment according to the present invention. As shown in these figures, the relationship between the collar portion of the hub and the driven plate may be reversed from that of FIG. 1. In this case, ball retaining recesses 52 are formed in a collar portion 51 of a hub 50 and V-shaped hollow portions 54 having bottom portions 54a are formed in a driven plate 53. A snap ring 55 is to ensure the position of the driven plate 53. In this embodiment, the hollow portions 54 are not radially-outwardly opening notches as shown in FIG. 1, but are apertures. Therefore, it is unnecessary to provide a sleeve portion positioned at the left end of the pressure plate 30 for preventing the balls from disengaging from the hollow portions 54. Alternatively, the notches 14, hollow portions 54 and ball retaining recesses 18, 52 may be disposed with the same intervals as mentioned before.

Figure 8:
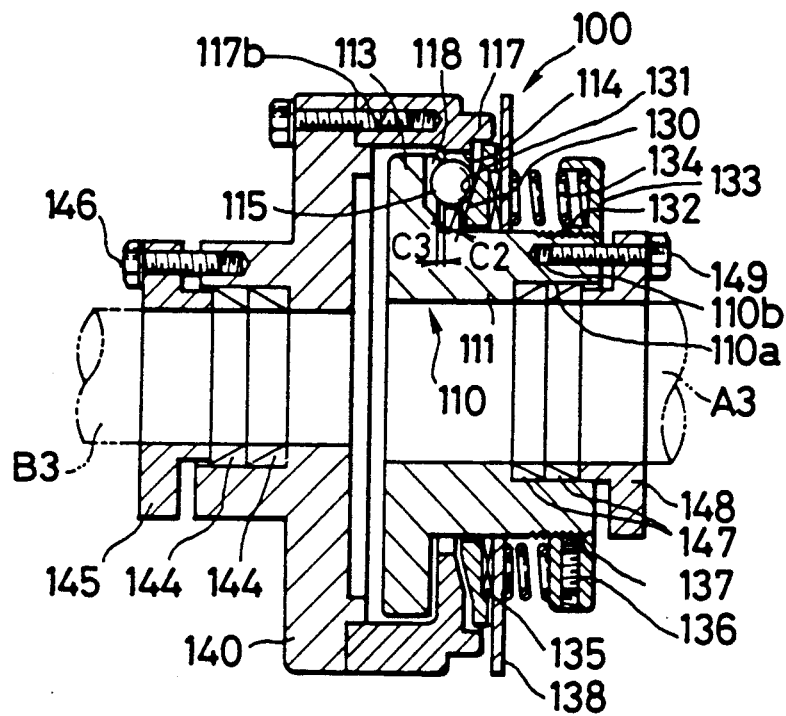
Figure 9:
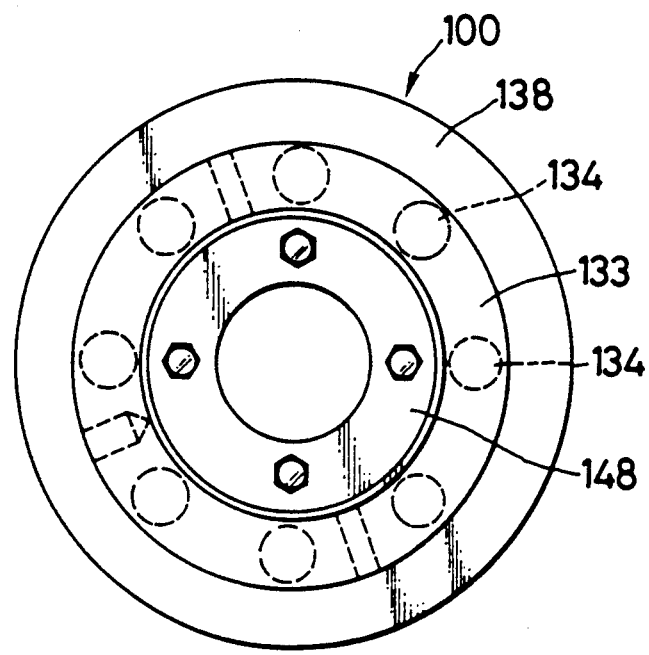

FIGS. 8 to 15 show a third embodiment of the present invention. This overload clutch 100 comprises a hub 110 and a driven plate 117 as shown in FIGS. 8 and 9.

Figure 10:
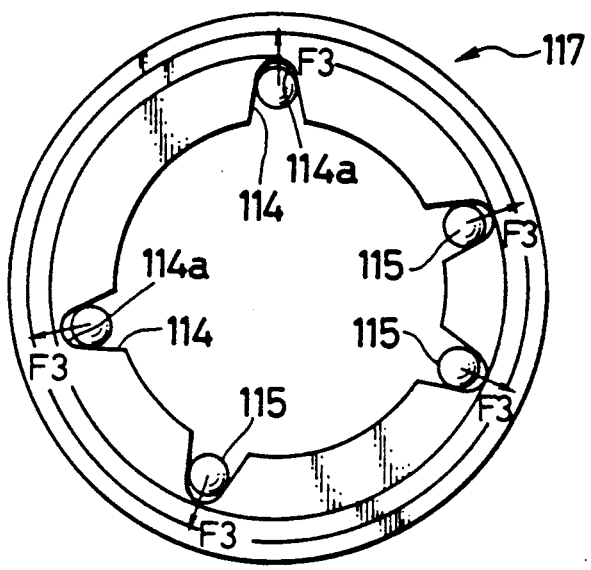

With reference to FIG. 10, a plurality of V-shaped notches (hollow portions for retaining torque transmitting elements) 114 are radially formed at irregular angular intervals in the driven plate 117 and widen toward the radially inner wall of the driven plate 117. A torque transmitting element or ball 115 is disposed in a bottom portion 114a of each notch 114.

The driven plate 117 has an internal screw 117b to fix with a coupling flange 140. The coupling flange 140 is fastened to a shaft B3 by a cylindrical part thereof. The numeral 144 denotes a known device which is used to fasten the coupling flange 140 and the shaft B3. The coupling flange 140 and the shaft B3 are fastened with the wedge action of taper rings by means of a pressing flange 145 and bolts 146.

Formed in the hub 110 are a collar portion 113 at one end of a cylindrical part 111, and a thread 132 on the outer surface at the other end of part 111, a stepped portion 110a in the inner surface, and an internal thread 110b in the end surface at the other end of the cylindrical part 111. A fastening device 147 secured in the stepped portion 110a is the same as the device 144 and fastens the hub 110 and the shaft A3 by means of a pressing flange 148 and bolts 149.

Figure 11:
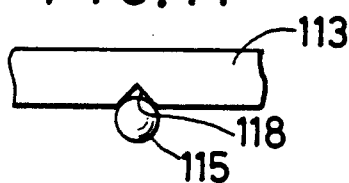
Figure 12:
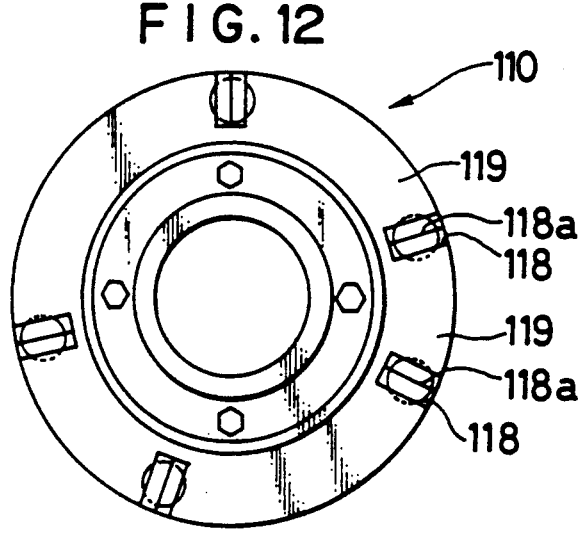
Figure 13:
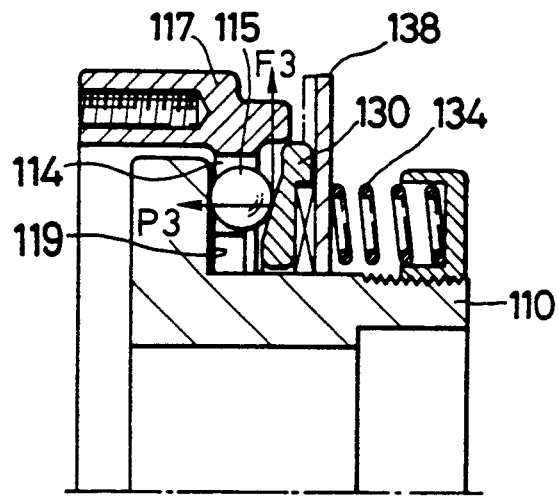

With reference to FIGS. 11 and 12, provided in the right-hand surface of the collar portion 113 are radially V-shaped recesses (recesses for retaining torque transmitting elements) at irregular angular intervals along the circumference.

A pressure plate 130 is rotatably supported with a clearance at its inner surface by the cylindrical part 111 of the hub 110. The end surface of the pressure plate 130 opposite the collar portion 113 has an inclining section 131 such that a conical surface is formed having a slope so as to oppose the bottom portions 114a of the notches 114 of the driven plate 117. The inclining section 131 functions to urge the balls 115 in the direction of the bottom portions 114a and bottom portions 118a of V-shaped recesses 118 by means of coil springs 134 as described hereinafter.

An adjusting nut 133 is threaded unto the thread 132 of the hub 110. Provided between the adjusting nut 133 and the pressure plate 130 are a plurality of coil springs 134, a disk-shaped sensing plate 138 and a thrust bearing 135. The adjusting nut 133 is to adjust the pressing force with which the pressure plate 130 urges the balls 115. Threading a set screw 136 in the adjusting nut 133 and engaging a locking plug 137 disposed at the end of the set screw after adjusting the pressing force, the loosening between the adjusting nut 133 and the threaded portion 132 may be prevented. The respective coil springs 134 are adapted to urge the pressure plate 130.

Further, in this embodiment, the thickness of the ball retaining portion of the driven plate 117 is less than the diameter of the balls 115. Thus, the driven plate 117 is disposed with a gap C2 relative to the pressure plate 130 and with a gap C3 relative to the collar portion 113. The pressing force given by the pressure plate 117 to the balls 115 causes the balls 115 to contact at two points relative to the bottom portions 114a of the notches 114 of the driven plate 117 in the direction F3 and relative to the bottom portions 118a of the V-shaped recesses 118 in the direction P3 (see FIGS. 13 and 14).

The radial position of the driven plate 117 relative to the pressure plate 130 may be determined positively by the pressing force F3, but the driven plate 117 is floating relative to the hub 110. The driven plate 117 is free to move in the axial direction within the range of the gap. Also, the pressure plate 130 maintains the floating condition relative to the hub 110. In spite of the floating condition, since the balls 115 contact at two points with the notches 114 of the driven plate 117 and the V-shaped recesses 118 of the collar portion 117 respectively, there is no backlash.

Figure 14:
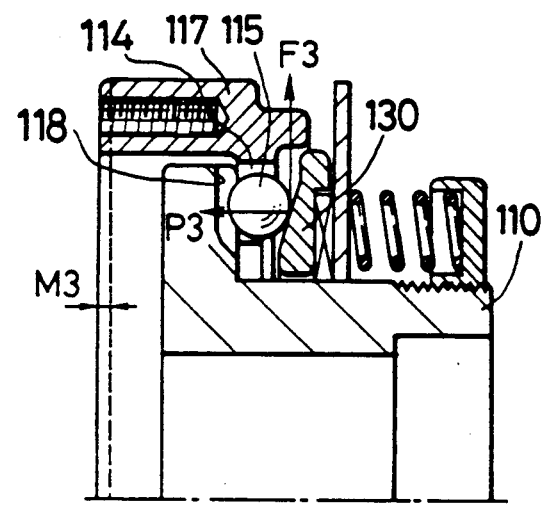
Figure 15:
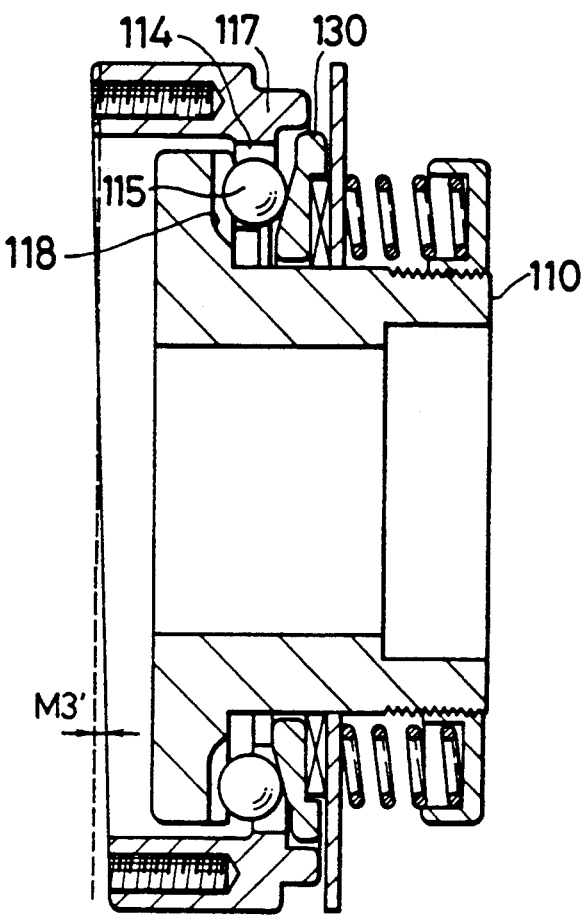

As explained above as to this embodiment, the driven plate 117 is provided relative to the hub 110 and the pressure plate 130 with gaps therebetween. Therefore, the driven plate 117 is permitted to make an axial movement relative to the hub 110 as shown in FIG. 14, even if there occurred any spacing misalignment M3 when the hub 10 is mounted to the shaft A3 and when the driven plate 117 and the coupling flange 140 are mounted to the shaft B3. Furthermore, the driven plate 117 is permitted to incline or tilt so as to absorb the error as shown in FIG. 15, even if there is any angular misalignment alignment M3' between the shafts A3 and B3.

Since the balls 115 can maintain stable positions by contacting the notches 114 of the driven plate 117 at two points and by contacting the V-shaped recesses 118 of the collar portion 113 of hub 110 at two points as result of the pressing force imposed by the pressure plate 130 when overload is not present during a torque transmitting rotating condition, the shafts A3 and B3 rotate integrally as a unit. As aforementioned, even if angular misalignment and/or axial misalignment occurs during rotation, the overload clutch 100 is capable of absorbing these misalignments. Needless to say, there is no backlash.

When an overload is encountered at the driven plate 117, the shaft A3 continues to rotate in spite of the driven plate 117 being prevented from rotating. Then, the balls 115 move to the right in FIG. 8 as guided by the bottom portions 114a in opposition to the component force P3, whereby the balls escape from the ball retaining recesses 118 and roll on the flat portions 119 (FIGS. 12 and 13), and are urged and held between the flat portions 119 and the bottom portions 114a. In the interim, the pressure plate 130 is kept away from the driven plate 117 by the balls 115.

The sensor plate 138 is movable in the axial direction along with the pressure plate 130. A limit switch, a proximity switch or a like device detects this movement, thereby detecting the overload condition.

As explained above, the ball clutch according to this embodiment, since the balls 115 are urged by the inclining surface section 131 between the bottom portions 114a of the notches 114 and the V-shaped recesses 118, and are supported by each of the hub 110 and the driven plate 117 at two points respectively, even if the rotating direction of the hub 110 is reversed, there is no backlash between the hub 110 and the driven plate 117.

Furthermore, even if an overload is encountered, the balls 115 can release by moving to the right in FIG. 8 while being guided by the bottom portions 114a so as to maintain the two-point contact with the driven plate 117. Since the balls 115 can again move to the left in FIG. 8 if the overload is removed, the balls 115 can again positively fall into or engage the V-shaped recesses 118, and accordingly re-engagement of the overload clutch is ensured.

Moreover, since each of the balls 115 invariably contacts the driven plate 117 at two points whether or not torque is being transmitted, the balls 15 can be restored to their respective original positions. This enables the notches 114 to be formed relatively roughly at a lower cost.

The overload clutch according to the first, second and third embodiments of this invention can eliminate backlash on account of the balls invariably contacting with the notches at two points. However, under the overload condition, since the balls are tightly urged to the bottom portions of the notches by the pressure plate during the relative rotation between the hub and the driven plate, the balls are prevented from freely rolling, and slippage takes place between the balls and the hub. Due to the above slippage, a so-called "dragging torque" is transmitted to the driven plate even when the overload is shut off. Therefore, the driven plate is likely to rotate integrally with the hub. In the worst case, seizure and/or wear may be caused. The embodiments as explained hereinafter are intended to make improvements as to such aspects.

FIGS. 16 to 22 show a fourth embodiment of the present invention. The structure of the overload clutch according to this embodiment is similar to that of the first embodiment.

Figure 16:
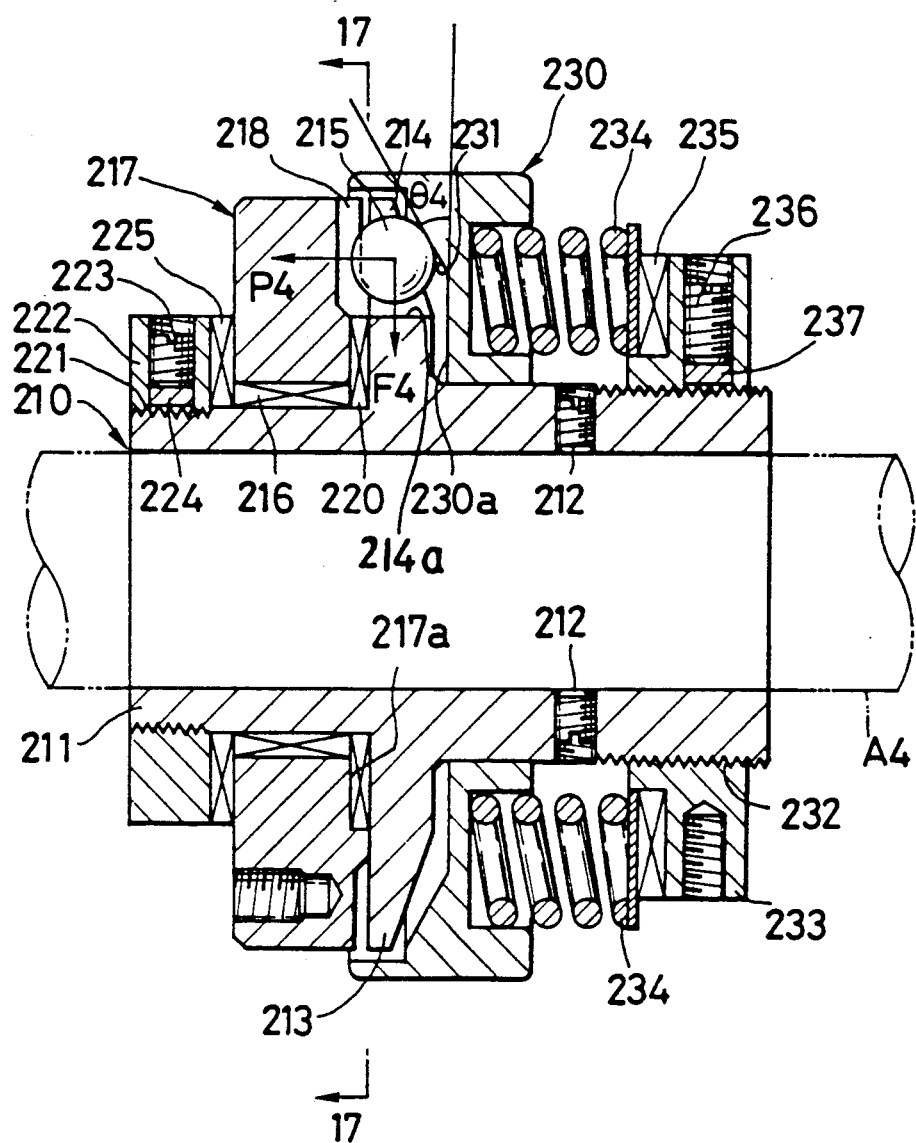

With reference to FIG. 16, a hub 210 has a collar portion 213 at the center of a cylindrical sleeve part 211. A set screw 212 is threaded to the hub 210 so as to project from an inner surface of the hub 210. Thus, the hub 210 is adapted to rotate along with a shaft A4.

As explained above with respect to the first embodiment, a plurality of V-shaped recesses 214 (hollow portions for retaining torque transmitting elements) are radially formed at irregular angular intervals in the collar portion 213 and they widen as they project radially outwardly through the outer circumference of the collar portion 213. Torque transmitting element or ball 215 (steel ball) is disposed in the bottom portion 214a of each notch 214.

With reference to FIG. 16, there is provided a disk-shaped driven plate 217, being separated from the left end surface of the collar portion 213 and which is rotatable via a radial bearing 216 mounted on the cylindrical part 211.

Figure 17:
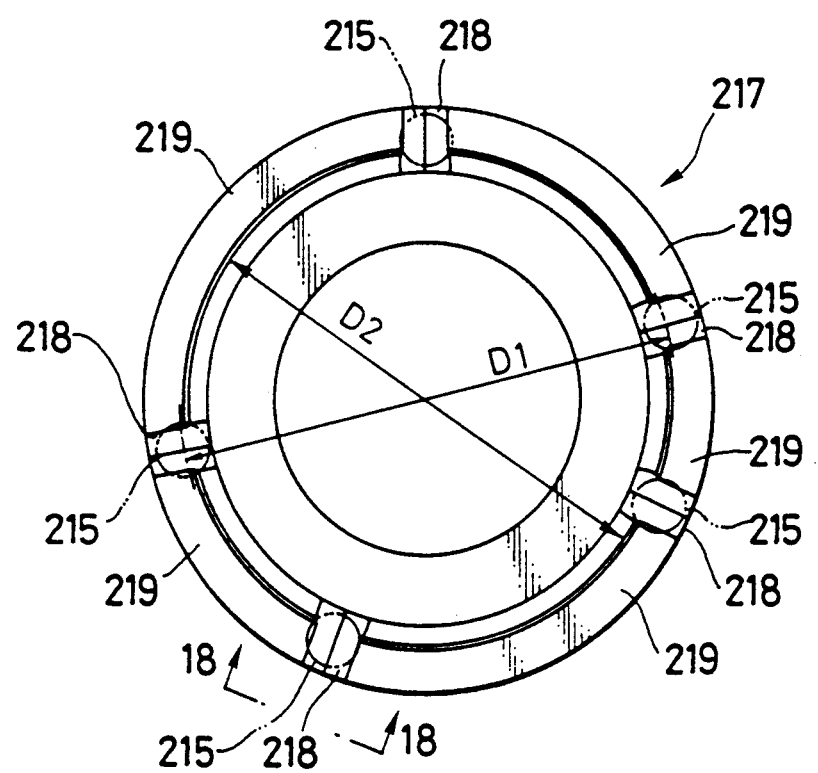
Figure 18:
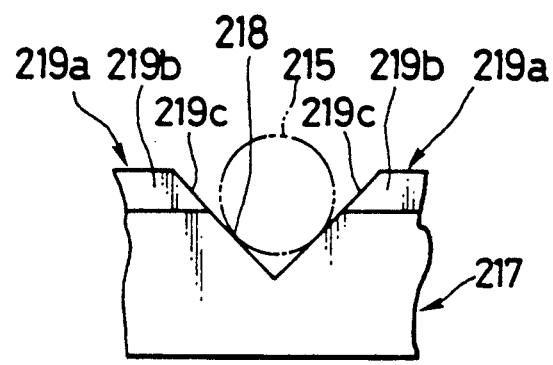
Figure 19:
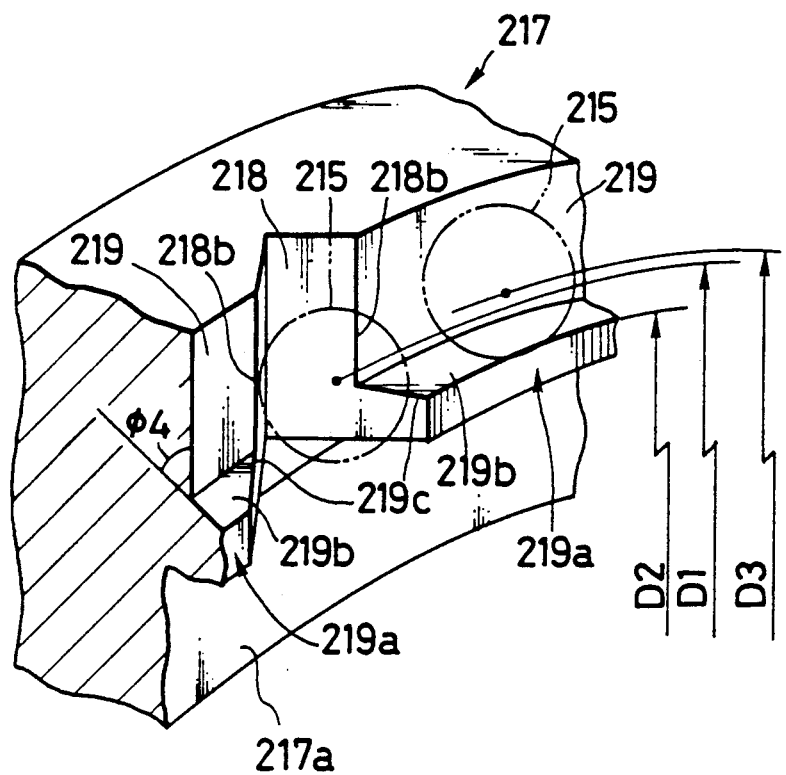
Figure 20:
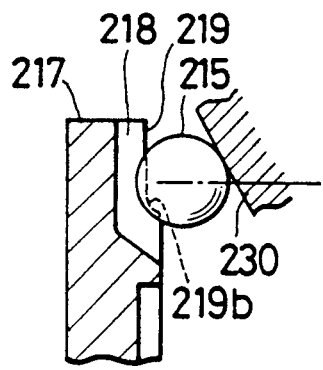

As shown in FIG. 17 to FIG. 19, V-shaped recesses 218 in which the balls 215 are disposed are radially formed on the right end surface 217a of the driven plate 217 adjacent to the collar portion 213 so as to face toward the notches 214 at the respective corresponding positions. Flat surface portions 219 are defined between the adjacent ball retaining recesses 218. Formed on these flat portions 219, adjacent the radially inner end thereof, are sloped step-portions 219a which project axially toward the collar portion 213. The sloped step-portions 219a begin at a diameter D2 which is smaller than the pitch circle diameter D1 of the circumferentially arranged balls 215, and incline axially and radially outwardly toward the ball retaining recesses 218 and join with the flat portions 219. The diameter D1 is a diameter derived by linking the centers of the balls 215 contacting with the notches 214 at two points as above explained. The inclined direction of the sloped step-portions 219a is the same as that of a pressure plate 230 as described later. The angle φ4 of inclination (as measured relative to an outward radial direction) of the sloped step-portions 219a is larger than the angle θ4 of inclination of the pressure plate (FIG. 16). Further, the edge 219c of the sloped surface 219b is made flush with the ball retaining recesses 218 so that the balls 215 may smoothly ride onto the sloped surface 219b when an overload is encountered. There is provided a thrust bearing 220 between the right end surface 217a of the driven plate 217 and the collar portion 213.

There is provided a thread 221 at the left-had end on the cylindrical part 211. A fixing nut 222 threads on the thread 221. The fixing nut 222 holds the driven plate 217 via the thrust bearing 220 closely against the collar portion 213. A set screw 223 threaded in the fixing nut 222 functions such that the locking plug 224 engages with the thread 221. Thus, the fixing nut 222 is prevented from loosening. There is also provided a thrust bearing 225 between the fixing nut 222 and the driven plate 217.

The pressure plate 230 is rotatably fitted at the right-hand side of the collar portion 213 on the cylindrical part 211 of the hub 210. An inclined annular surface section 231 is formed near the radially outer edge of the end surface 230a of the pressure plate 230 so as to oppose the collar portion 213. The inclined section 231 is in the form of a truncated cone and has a falling gradient toward the shaft A4. The inclined section 231 urges the balls 215 radially inwardly toward the bottom portions 214a of the notches 214 and axially into the ball retaining recesses 218 due to urging of the springs 234 as explained later.

The hub 210 is provided with a thread 232 at the right-hand end thereof. An adjusting nut 233 engages the thread 232.

The coil springs 234 are provided between the adjusting nut 233 and the pressure plate 230 via a thrust bearing 235. The adjusting nut 233 is to adjust the force with which the pressure plate 230 urges the balls 215. A locking plug 237 positioned at the inner side of a set screw 236 presses against the thread 232 such that the adjusting nut 233 is prevented from loosening.

On the assumption that the shaft A4 is a driving side and that the driven plate 217 is a driven side, the operation will now be described.

When there is no overload, the balls 215 are urged by the force received from the inclined section 231. The force acts simultaneously toward the ball retaining recesses 218 due to the axial component force P4 (FIG. 16) relative to the shaft A4 and toward the bottom portions 214a of the notches 214 due to the perpendicular (i.e. radial) component force F4 relative to the shaft A4. Each ball 215 contacts the bottom portion 214a of the respective notch 214 at two points, contacts the respective ball retaining groove 218 of the driven plate 217 at two points, and contacts the inclined section 231 of the pressure plate 230 at one point. Thus, the ball 215 contacts at five points in all. Accordingly, the balls 215 are urged into the V-shaped ball retaining recesses 218 and are held stably, and the ball clutch rotates as an integral body. Therefore, rotating torque of the shaft A4 may be transmitted to a suitable mechanism (not shown) connected with the driven plate 217.

Figure 21:
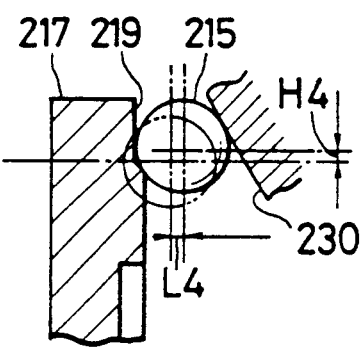

When an overload is encountered in the driven plate 217, the shaft A4 continues to rotate in spite of the driven plate 217 being prevented from rotating. Then, the balls 215 move to the right in FIG. 16 under the guidance of the bottom portions 214a, in opposition to the component force P4, and escape from the ball retaining recesses 218 so as to roll onto the flat portions 219. This rolling action is caused when the balls 215 travel beyond the boundary edge 218b where recess 218 joins with the flat portion 219 (see FIG. 19) and move axially by the length L4 as shown in FIG. 21. The balls 215 may smoothly ride onto the sloped surfaces 219b being guided by the edge 219c. The reference D3 denotes the pitch circle diameter of the balls 215 after they have moved as above mentioned.

The balls 215 may thus ride on the sloped surface 219b of the step-portion 219a. Then, since the angle of inclination φ4 of the sloped surface 219b is set greater than the angle of inclination θ4 of the pressure plate 230, the balls 215 are moved radially outwardly by a distance H4 as shown in FIG. 21 under the influence of the radial force component. Accordingly, the balls 215 are supported by three members which are the pressure plate 230, flat portions 219 and the sloped step-portions 219a.

Figure 22:
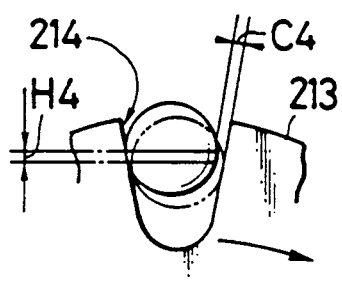

FIGS. 21 and 22 show the travel of the balls 215 and the relationship between the balls 215 and the notches 214 when the balls 215 have ridden onto the sloped step-portions 219a. The balls 215 which have moved radially the distance H4 are free from the wedge action with which the pressure plate 230 presses the balls 215 tightly into the notches 214. Consequently, the balls 215 are supported with the three members which are the pressure plate 230, the flat portions 219 and the sloped step-portions 219a, and can freely roll. Since the gap C4 exists between the balls 215 and the notches 214 when the balls 215 rotate, the rotation of the balls 215 is not hindered at all.

As a result, the rotation of the hub 210 is set idle so that the driving shaft A4 may idly rotate.

As described above, when the ball clutch according to this embodiment is in the torque transmitting condition, there is no backlash between the hub 210 and the driven plate 217 since the balls 215 are urged by the inclined section 231 between the bottom portions 214a of the notches 214 and the V-shaped recesses 218, and are supported by the hub 210 and the driven plate 217 with two-point contacts respectively, even if the rotating direction of the hub 210 is reversed.

Furthermore, in an overload condition, the balls 215 begin to move axially rightwardly under the guidance of the bottom portions 214a. As aforementioned, when the balls 215 ride on the flat portions 219, the balls 215 are supported by the pressure plate 230, flat portions 219 and the sloped step-portions 219a and are freed from the two-point contact with the notches 214, and therefore, are capable of freely rolling.

As the overload condition is removed and the balls 215 are restored to their original positions, the balls 215 fall into the ball retaining recesses 218 of the driven plate 217 and again contact with the bottom portions 214a at two points. Namely, the balls 215 reengage with the bottom portions 214a with no backlash.

Moreover, since the balls 215 contact with the hub 210 at two points due to the wedge action during torque transmission, the balls 215 can assume the predetermined positions regardless of the machining accuracy of the notches 214. Accordingly, the notches 214 may be formed at a lower manufacturing cost.

Figure 23:
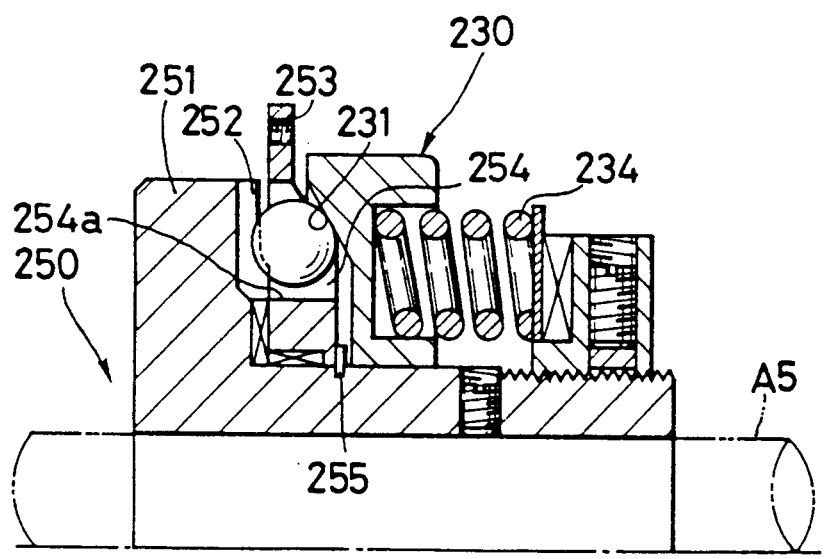
FIG. 23 is an axial sectional view of a fifth embodiment of this invention.
Figure 24:
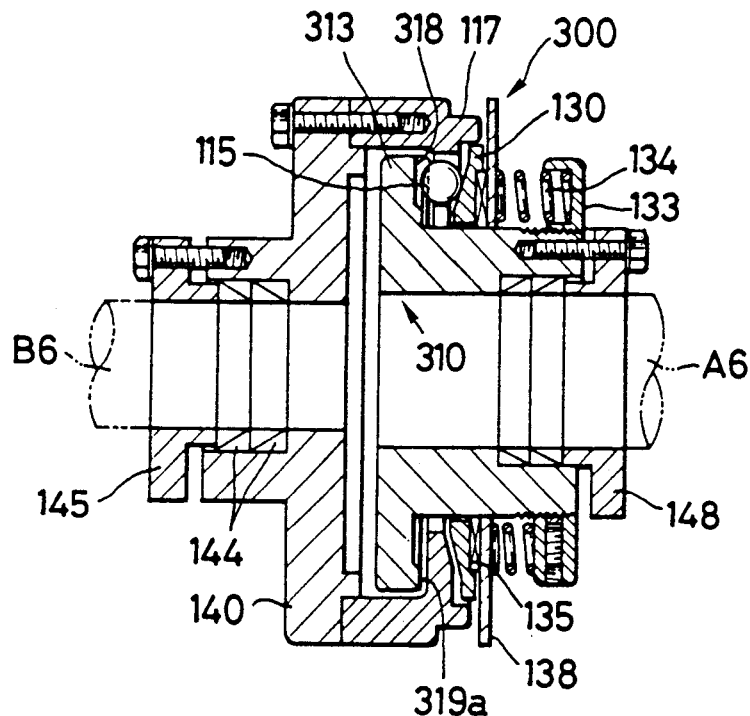

FIG. 23 shows a fifth embodiment of this invention. It will be noted that the relationship between the collar portion of the hub and the driven plate is reversed from that of FIG. 16. In this case, ball retaining recesses 252 are formed in a collar portion 251 of the hub 250 and the V-shaped hollow portions 254 having the bottom portions 254a are formed in a driven plate 253. A snap ring 255 is to ensure the position of the driven plate 253. In this embodiment, the hollow portions 254 are "apertures" and not radially-opening notches. Therefore, it is unnecessary to provide a sleeve portion positioned at the left-hand end of the pressure plate 230 for preventing the balls from falling out of the hollow portions 254.

Alternatively, the notches 214, hollow portions 254 and the ball retaining recesses 218, 252 may be arranged at equal angular intervals.

Finally, FIGS. 24 to 30 show a sixth embodiment of the present invention.

The structure of the overload clutch according to this embodiment is similar to that of the third embodiment (FIGS. 8 to 15). Thus, the same reference numerals as used with respect to FIGS. 8 to 15 are used in FIGS. 24 to 30 to indicate like members. The major difference lies in the difference of the shape of the collar portion of the hub.

Figure 25:
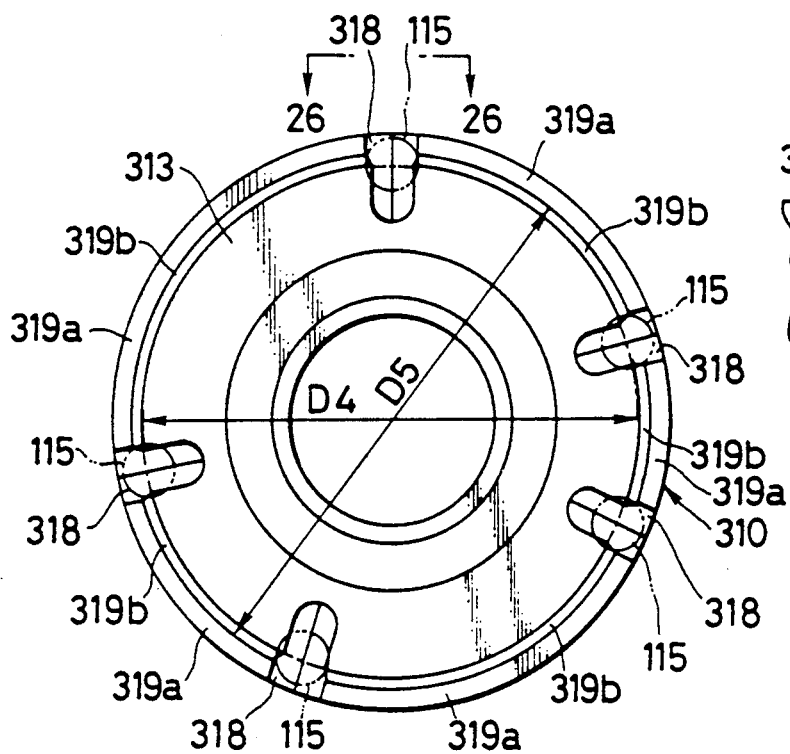
Figure 26:
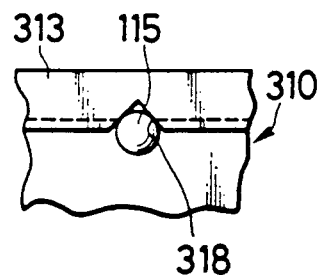

As shown in FIG. 25, formed in the collar portion 313 are somewhat elongated V-shaped recesses 318 in corresponding relationship with the notches 114. The portions between the V-shaped recesses 318 are flat portions 319.

Figure 27:
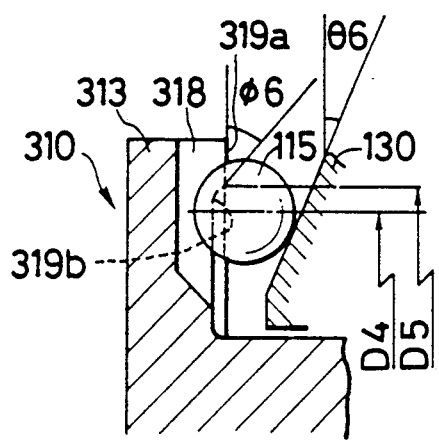
Figure 28:
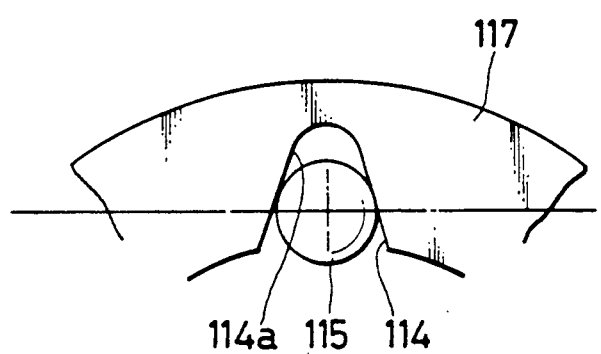

Formed on these flat portions 319 are sloped step-portions 319a which are located at the radially outer edge of the flat portions 319, and which project axially toward the pressure plate 130. The sloped step-portions 319a begin at a diameter D5 which is greater than the pitch circle diameter D4 of the circumferentially arranged balls 115, incline axially and radially inwardly toward the V-shaped recesses 318 and join with the flat portions 319. The diameter D4 is a diameter derived by linking the centers of the balls 115 contacting with the V-shaped notches 114 at two points. Referring to FIG. 27, the inclined direction of the sloped step-portions 319a is the same as that of the pressure plate 330 as explained later. The angle $\phi 6$ of inclination of the sloped step-portions 319a is larger than the angle $\theta 6$ of inclination of the pressure plate 130. The edge of the sloped surface 319b is made flush with the V-shaped recesses 318 so that the balls 115 may smoothly ride onto the slope surface 319b when an over-load is encountered. This embodiment is the same as the third embodiment in other respects.

Figure 29:
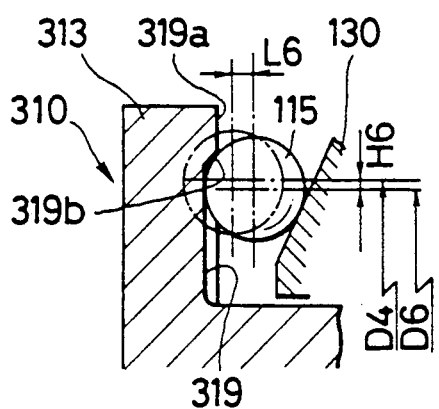

This riding action is caused when the balls 115 ride beyond the boundary section of the flat portions 319 from the V-shaped recessed 318 and move axially by the distance L6 as shown in FIG. 29. The balls 115 may ride onto the sloped surface 319b by being guided by the edge of the sloped surface 319b.

Figure 30:
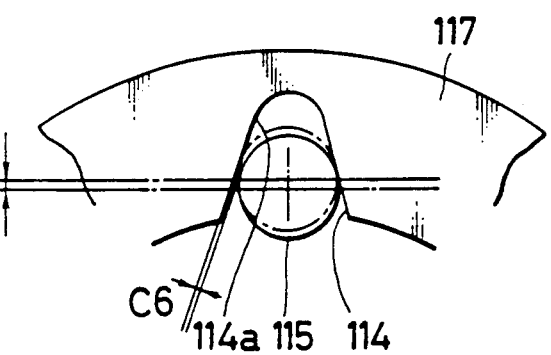

The balls 115 may thus ride on the sloped surface 319b of the sloped step-portion 319a. Then, since the angle of inclination $\phi 6$ of the sloped surface 319b is greater than the angle of inclination $\theta 6$ of the pressure plate 130, the balls 115 move radially inwardly by a distance H6 as shown in FIGS. 29 and 30. Accordingly, the balls 115 are supported by three members which are the pressure plate 130, flat portions 319 and the sloped step-portions 319a.

The balls 115 which have moved radially the distance H6 are freed from the wedge action with which the pressure plate 130 presses the balls 115 tightly into the notches 314. Under this condition, the balls 115 are supported with the three members which are the pressure plate 130, the flat portions 319 and the sloped step-portions 319a, and can freely roll. Since a gap C6 exists between the balls 115 and the notches 314 when the balls 115 rotate, the rotation of the balls 115 is free.

If an overload is encountered, the balls 115 begin to move under the guidance of the bottom portions 314a. As aforementioned, When the balls 115 ride on the flat portions 319 of the hub 310, the balls 115 are supported by the pressure plate 130, flat portions 319 and the sloped step-portions 319a and are freed from two-point contact with the notches 114, and therefore, are capable of freely rolling.

After the causes of the overload condition have been removed and the balls 115 have been restored to their original positions, the balls 115 can exactly fall into the V-shaped recesses 318 of the driven plate 117 and contact with the bottom portions 114a at two points, respectively. Thus, the balls 115 engage with the bottom portions 114a with no backlash.

It is to be noted that the widening direction of the notches 114 may be radially reversed as in the previous embodiments. Also, the notches 114 and recesses 118, 318 may be provided at equal angular intervals.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an overload clutch in which torque transmitting elements are held within hollow portions formed in one of a driving member or a driven member and are urged by a pressure member against recesses formed in the other of the driving member or driven member so that torque may be transmitted and the torque transmitting elements are adapted to escape from said recesses in opposition to an urging force, comprising the improvement wherein said pressure member is formed with an inclined section means for pressing the torque transmitting elements along a direction which substantially intersects a rotational axis of the overload clutch, said hollow portions for holding the torque transmitting elements are generally V-shaped when viewed axially, and said recesses for holding the torque transmitting elements are grooves which open axially toward the hollow portions and are of V-shaped cross section when viewed radially.

2. The overload clutch according to claim 1, wherein said driven member is held between the driving member and the pressure member with respective clearance gaps therebetween.

3. The overload clutch according to claim 1, wherein the other member has flat portions between the recesses and provided with sloped step-portions which are located near the bottoms of said hollow portions from the pitch circle of the torque transmitting elements when they are in contact at two points with the hollow portions such that the angle of inclination of the step-portions is greater than the angle of inclination, of the inclined section means of the pressure member.

4. A clutch according to claim 1, wherein said torque transmitting elements comprise balls.

5. A clutch according to claim 4, wherein said hollow portions and said grooves are elongated generally radially of the respective member.

6. An overload clutch, comprising:
a driving member supported for rotation about a clutch axis;
a driven member disposed axially adjacent the driving member and supported for rotation substantially about the clutch axis;
one of said members having a plurality of openings formed axially therethrough in circumferentially spaced relationship therearound, each said opening when viewed axially being defined between a pair of opposed side walls which converge with respect to one another in a radial direction relative to said clutch axis;
the other said member being disposed axially adjacent one side of said one member and having an axial end face which directly faces said one member, said other member having a plurality of channellike grooves formed in said axial end face, said grooves extending generally radially relative to said clutch axis and being circumferentially spaced at positions corresponding to the positional spacing of said openings;
a torque transmitting ball positioned within each said opening and being engagable with one of said channellike grooves for effecting torque transmitting driving engagement between said driving and driven members;
a pressure plate disposed axially adjacent the other side of said one member and having an annular end surface which is normally maintained in contact with said balls for urging said balls axially of said openings into engagement with said other member;
means for urging said pressure plate and said other member relatively axially toward one another for normally maintaining said balls in engagement with said channellike grooves and for also normally maintaining said balls in contact with both of the opposed side walls of the openings; and
said annular end surface on said pressure plate being of a truncated conical configuration which extends at an incline relative to a radial direction so that the pressure plate normally urges the balls radially of the openings in the direction in which the opposed side walls of the openings converge so that the ball is normally maintained in contact with each of the opposed side walls of the respective opening.

7. A clutch according to claim 6, wherein said openings are of a generally V-shaped configuration when viewed axially with the opposed side walls of the respective opening converging with respect to one another in an inward radial direction, said opening extending radially outwardly through a surrounding outer peripheral surface of said one member, and wherein said truncated conical surface is an interior surface which is inclined radially outwardly as it projects axially toward said other member.

8. A clutch according to claim 7, wherein said pressure plate includes an annular sleeve portion which is disposed radially outwardly of said conical surface and which projects axially in surrounding relationship to the outer peripheral surface of said one member for containing the balls within the openings.

9. A clutch according to claim 6, wherein the one member is of an annular configuration having a central bore extending coaxially therethrough as defined by an inner substantially cylindrical peripheral surface of said one member, and wherein said truncated conical surface is an exterior surface which is inclined radially inwardly as it projects axially toward said other member.

10. A clutch according to claim 9, wherein said other member includes a coaxial hub part which extends through said central bore for confining said balls within said openings.

11. A clutch according to claim 6, wherein said axial end face on said other member has a stepped profile when viewed in axial cross section and includes a first annular end surface which extends in a generally radial direction and which at one radial edge thereof is joined to a second annular end surface which projects axially away from said first end surface in an axial direction generally toward said one member, said second annular end surface being of a truncated conical configuration in that it is inclined relative to the clutch axis with the axial direction of incline of said second annular surface being the same as the axial direction of incline of the truncated conical surface on said pressure plate, whereby said balls rollingly contact said second annular surface during an overload condition.

12. A clutch according to claim 11, wherein the opposed side walls of the openings converge relative to one another in a radial inward direction, and wherein said second annular surface is defined at the radially inner edge of said first annular surface, said second annular surface effecting limited radial outward displacement of the balls within the respective openings during an overload condition.

13. A clutch according to claim 11, wherein the opposed side walls of the openings converge relative to one another in a radial outward direction, and wherein said second annular surface is defined at the radially outer edge of said first annular surface, said second annular surface effecting limited radial inward displacement of the balls within the respective openings during an overload condition.

14. A clutch according to claim 11, wherein the truncated conical surface and said second annular surface are of different inclines relative to the clutch axis.

15. A clutch according to claim 6, wherein said channellike grooves are of generally V-shaped cross section when viewed in a radial direction.

* * * * *